US011694370B2

(12) United States Patent
Ghosh et al.

(10) Patent No.: US 11,694,370 B2
(45) Date of Patent: Jul. 4, 2023

(54) USING A PREDICTIVE MODEL TO DETERMINE VIRTUAL USAGES OF STORAGE SPACES IN A STORAGE INFRASTRUCTURE

(71) Applicant: International Business Machines Corporation, Armonk, NY (US)

(72) Inventors: Partho Ghosh, Kolkata (IN); Venkata Vara Prasad Karri, Visakhapatnam (IN); Ramprasad Bhat, Bangalore (IN); Saraswathi Sailaja Perumalla, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/497,823

(22) Filed: Oct. 8, 2021

(65) Prior Publication Data

US 2023/0115127 A1    Apr. 13, 2023

(51) Int. Cl.
*G06T 11/00* (2006.01)
*G06F 3/01* (2006.01)
(Continued)

(52) U.S. Cl.
CPC ............. *G06T 11/00* (2013.01); *G06F 3/013* (2013.01); *G06N 5/02* (2013.01); *G06F 1/163* (2013.01)

(58) Field of Classification Search
CPC ...................................................... G06T 11/60
See application file for complete search history.

(56) References Cited

U.S. PATENT DOCUMENTS 10,540,821 B2   1/2020  Musunuri et al.
11,514,766 B1 * 11/2022  McDaniel ............ G08B 13/248
(Continued)

FOREIGN PATENT DOCUMENTS

CN    111858750 A    10/2020

OTHER PUBLICATIONS

Ahmed, S.I., "An Efficient System for Searching Frequently Lost Objects Using Binary Detection Sensor", [online], Jan. 2009, Retrieved from the Internet at <URL: https://www.researchgate.net/publication/228871971_An_efficient_system_for_searching_frequently_lost_objects_using_binary_detection_sensor>, 9 pp.
(Continued)

*Primary Examiner* — Shivang I Patel
(74) *Attorney, Agent, or Firm* — Konrad Raynes Davda & Victor LLP; David W. Victor

(57) ABSTRACT

Provided are a computer program product, system, and method for using a predictive model to determine virtual usages of storage spaces in a storage infrastructure. Information on the storage infrastructure indicates storage spaces in the storage infrastructure, including physical boundaries and usages of the storage spaces and a predictive model used to determine storage spaces for items to store in the storage spaces. The predictive model receives as inputs physical boundaries and usages of a selected storage space. The predictive model processes the inputs to output a virtual usage of the selected storage space within the physical boundaries of the selected storage space. The virtual usage is defined by coordinates in the physical boundaries of the selected storage space. Augmented reality representation overlaying the virtual usage at the coordinates within a view of the selected storage space are generated in a computer display.

20 Claims, 9 Drawing Sheets

(51) Int. Cl.
  *G06N 5/02* (2023.01)
  *G06F 1/16* (2006.01)

(56) References Cited

U.S. PATENT DOCUMENTS

| | | | |
|---|---|---|---|
| 2017/0024838 A1 | 1/2017 | Kropp | |
| 2019/0149725 A1 | 5/2019 | Adato et al. | |
| 2019/0279426 A1* | 9/2019 | Musunuri | G06Q 10/08 |
| 2021/0004756 A1* | 1/2021 | Kulkarni Wadhonkar | G06V 20/52 |

OTHER PUBLICATIONS

Bobeshko, A., "Object Recognition in Augmented Reality—Virtual Reality Pop", [online], Apr. 17, 2017, [Retrieved on Aug. 28, 2021], Retrieved from the Internet at <URL: https://virtualrealitypop.com/object-recognition-in-augmented-reality-8f7f17127a7a>, 7 pp.

Breen, D.E., "Interactive Occlusion and Automatic Object Placement for Augmented Reality", Computer Graphics Forum, vol. 15, Issue 3, Aug. 1996, 12 pp.

Hook, A., "Ways of Expressing the Placement of Objects in Augmented Reality", [online], Nov. 1, 2018, [Retrieved on Aug. 28, 2021], Retrieved from the Internet at <URL: https://anselm.medium.com/ways-of-expressing-the-placement-of-objects-in-augmented-reality-f5e5d80923ba>, 3 pp.

Immaculate, D.S., et al., "Efficient Detection of Missing Object Using Zigbee Technology", Proceedings of the 2017 IEEE 3rd International Conference on Sensing, Signal Processing and Security (ICSSS), 2017, 5 pp.

Joshi, N., "3 Ways Augmented Reality Can Transform Warehouse Management", [online], Jun. 23, 2019, [Retrieved on Aug. 28, 2021], Retrieved from the Internet at <URL: https://www.allerin.com/blog/3-ways-augmented-reality-can-transform-warehouse-management>, 4 pp.

List of IBM Patents or Patent Applications Treated as Related, Oct. 8, 2021, 2 pp. [57.524 (Appendix P)].

U.S. Appl. No. 17/493,832, filed Oct. 4, 2021, Invented by Partho Ghosh et al., 41 pp. [57.521 (Appln)].

\* cited by examiner

USING A PREDICTIVE MODEL TO DETERMINE VIRTUAL USAGES OF STORAGE SPACES IN A STORAGE INFRASTRUCTURE

BACKGROUND OF THE INVENTION

1. Field of the Invention

The present invention relates to a computer program product, system, and method for using a predictive model to determine virtual usages of storage spaces in a storage infrastructure.

2. Description of the Related Art

Space planning to store items at home or in a business warehouse can provide significant cost savings when users retrieve items from the storage spaces. Disorganized spaces can cause unnecessary labor costs, poor workflow and management, and lost time. The incorrect use of storage systems and racking arrangements result in many companies and/or homes finding their shelves full, with no space to receive new inventory or their shelves having expired items or too much free space. A disorganized storage space at home or in an industrial warehouse can result in unnoticed expiry of items, increase of stress and frustration to look for items, loss of time, and placement of items at locations inaccessible to users. In an industrial warehouse, forklift operators may spend considerable time searching the warehouse for slots in the storage racking for new inventory. This results in the forklift operator slotting the pallet of inventory wherever they find an empty space. Since the pallet family and size is not carefully considered in its allocation, a large amount of inventory may be slotted in an unorganized manner, with no room to reorganize due to limited warehouse space.

There is a need in the art for improved techniques for organizing storage spaces in a storage infrastructure.

SUMMARY

Provided are a computer program product, system, and method for using a predictive model to determine virtual usages of storage spaces in a storage infrastructure. Information on the storage infrastructure indicates storage spaces in the storage infrastructure, including physical boundaries and usages of the storage spaces and a predictive model used to determine storage spaces for items to store in the storage spaces. The predictive model receives as inputs physical boundaries and usages of a selected storage space. The predictive model processes the inputs to output a virtual usage of the selected storage space within the physical boundaries of the selected storage space. The virtual usage is defined by coordinates in the physical boundaries of the selected storage space. Augmented reality representation overlaying the virtual usage at the coordinates within a view of the selected storage space are generated in a computer display.

DETAILED DESCRIPTION

Described embodiments provide improvements to computer technology for inventory and storage management by using a predictive model, implementing machine learning and artificial intelligence technology, to process a selected storage space, storage space attributes, attributes of items stored in the storage space, and attributes of users of the storage space to determine a virtual usage of the storage space. In further embodiments, information on an outputted virtual usage for a storage space is saved with historical virtual usage output including a user ranking whether the output virtual usage was applicable to the storage space. This historical virtual usage output may be used to continually train the predictive model to output virtual usages based on feedback of a previous output virtual usage to increase the likelihood the predictive model outputs a virtual usage for a storage space that optimizes the usage of the storage space.

Figure 1:
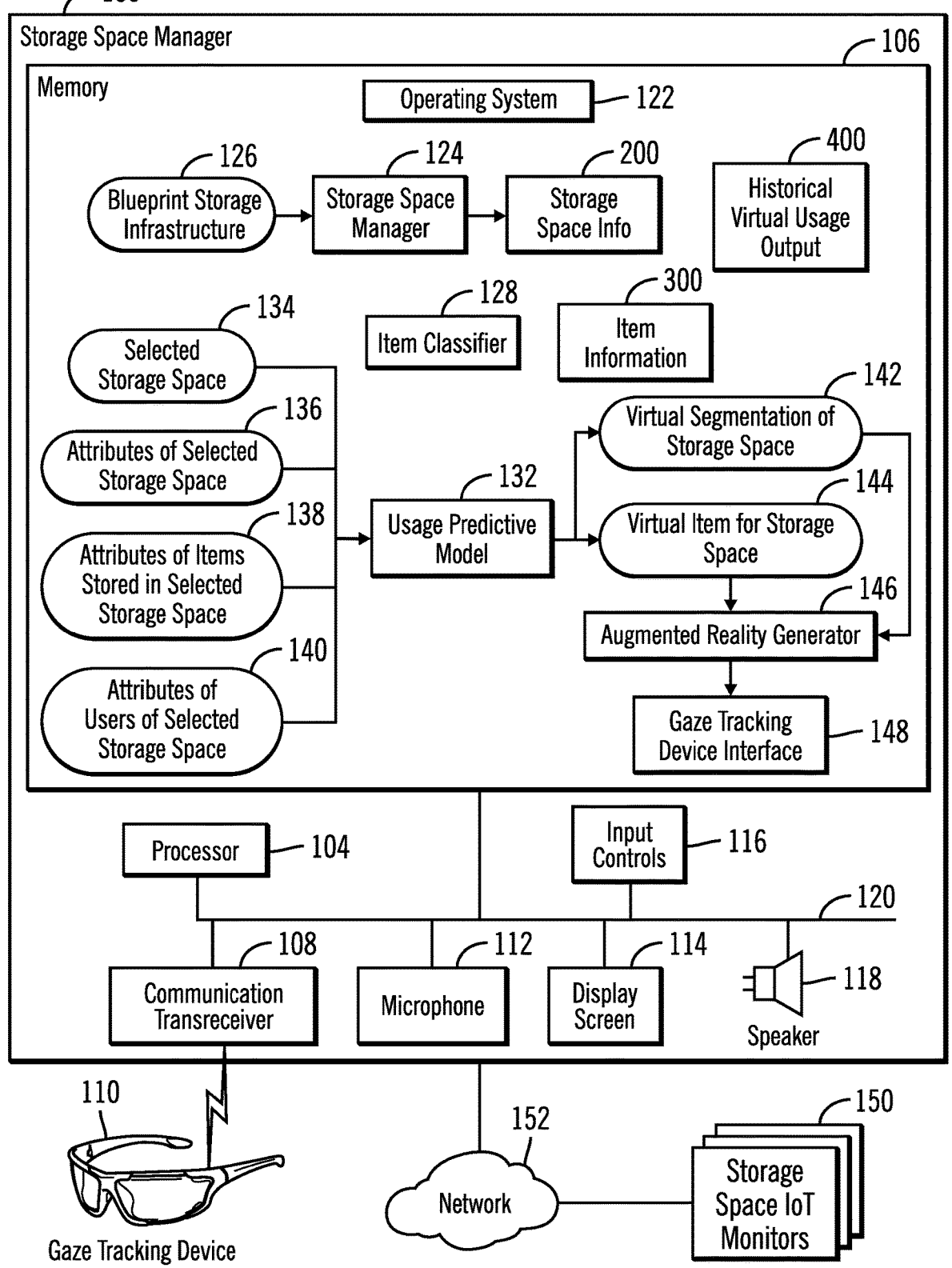
FIG. 1 illustrates an embodiment of a storage space manager interfacing with a gaze tracking device.

FIG. 1 illustrates an embodiment of a storage space manager system 100 to determine storage spaces for items in a storage infrastructure and render augmented reality representations of the placement of items in the storage spaces. The storage space manager system 100 includes a processor 104, a main memory 106, a communication transceiver 108 to communicate (via wireless communication or a wired connection) with external devices, including a wearable gaze tracking device 110; a microphone 112 to receive as input sound external to the storage space manager 100; a display screen 114 to render display output to a user of the storage space manager 100; a speaker 118 to generate sound output to the user; input controls 116 such as buttons and other software or mechanical buttons, including a keyboard, to receive user input. The components 104-118 may communicate over one or more bus interfaces 120.

The gaze tracking device 110 includes computer display capabilities to display information and augmented reality representations from the storage space manager 100, including to project augmented reality representations on the gaze tracking device 110 glass or display for the user to view.

The main memory 106 may include various program components including an operating system 122 to manage the storage space manager 100 operations and interface with device components 104-118; a storage space manager program 124 to manage the storage space and generate storage space information 200 for storage spaces identified in a blueprint for the storage infrastructure 126; an item classifier 128 to classify an item detected in a storage space and generate item information 300 having information on the item; and a usage predictive model 132, which may comprise a machine learning module.

The usage predictive model 132 receives as input any combination of: a selected storage space 134; attributes of the selected storage space 136 from storage space information 200 for the selected storage space; item attributes 138 from the item information 300 of items stored in the selected storage space 134; and attributes of users 140 of the selected storage space 134, such as users of the storage infrastructure including the selected storage space 134. The usage predictive model 132 processes the received inputs and outputs a virtual usage for the selected storage space 134, such as a virtual segmentation 142 of the storage space and/or virtual item 144 to store in the selected storage space 134. In additional embodiments, other types of virtual usages of the selected storage space 134 may be determined to visualize using the augmented reality generator 146 and gaze tracking device 110.

The memory 106 further includes an augmented reality generator 146 to generate an augmented reality representation of the virtual usage, e.g., virtual segmentation or virtual item, overlayed over the selected storage space 134; and a gaze tracking device interface 148 to interface with the gaze tracking device 110 to render augmented reality representations of items overlayed in the storage spaces of the storage infrastructure and determine objects in a field of view on which the user is gazing, such as storage spaces and items in the storage spaces.

The storage space manager 100 may receive sensed information on the storage spaces, such as temperature, humidity, light exposure from storage space Internet of Things (IoT) monitors 150 over a network 152. The attributes of the storage spaces in the storage space information 200 may be updated with sensed information from the storage space (IoT) monitors 150. The IoT monitors 150 monitoring the storage spaces may include cameras and sensors to sense temperature, humidity, light exposure.

The term "augmented reality" as used herein refers to augmented reality, mixed reality, and other visual representations in which augmented reality images and information are rendered overlayed on a real world field of view.

In certain embodiments, the item classifier 128 and the usage predictive model 132 may use machine learning and deep learning algorithms, such as decision tree learning, association rule learning, neural network, inductive programming logic, support vector machines, Bayesian network, etc. For artificial neural network program implementations, the neural network may be trained using backward propagation to adjust weights and biases at nodes in a hidden layer to produce the virtual usage of the selected storage space, such as virtual segmentation 142 of the selected storage space 134 and/or virtual item 144 placed in the selected storage space 134. In backward propagation used to train a neural network machine learning module, biases at nodes in the hidden layer are adjusted accordingly to produce the virtual usage of the selected storage space having specified confidence levels based on the input parameters, such as selected storage space 134, selected storage space attributes 136, item attributes 138, and user attributes 140. Backward propagation may comprise an algorithm for supervised learning of artificial neural networks using gradient descent. Given an artificial neural network and an error function, the method may calculate the gradient of the error function with respect to the neural network's weights and biases.

In backward propagation used to train a neural network machine learning module, such as the usage predictive model 132, margin of errors, such as used in an optimized cost function, are determined based on a difference of the calculated predictions and user rankings of the virtual usage, virtual segmentation 142 and virtual item 144. Further, information on whether the selected storage space 134 was eventually divided according to the virtual segmentation 142 or actual items placed as predicted by the virtual item 144 may be used to modify the confidence levels for the output virtual segmentation 142 and virtual item 144 based on the inputs 134, 136, 138, and 140. Biases at nodes in the hidden layer are adjusted accordingly to decrease the confidence levels when the actual division of the selected storage space 134 or actual item placed in the selected storage space 134 does not match the virtual segmentation 142 or virtual item 144, respectively, and increase the confidence levels for the output virtual segmentation 142 or virtual item 144 when the actual division or actual item for the selected storage space 134, respectively, matches.

In an alternative embodiment, the components 128 and 132 may be implemented not as a machine learning module, but implemented using a rules based system to determine the outputs from the inputs. The components 128 and 132 may further be implemented using an unsupervised machine learning module, or machine learning implemented in methods other than neural networks, such as multivariable linear regression models.

The arrows shown in FIG. 1 between the components and objects in the memory 106 represent a data flow between the components.

The storage space manager 100 may comprise a smart phone, personal digital assistance (PDA), smartwatch or stationary computing device capable of processing user information observed through the gaze tracking device 110. In further implementations, the storage space manager 100 may be integrated in the electronics of the gaze tracking device 110.

The storage space manager 124 may also generate historical virtual usage output 400 having inputs 134, 136, 138, 140 used by the usage predictive model 132 to produce an output virtual segmentation 142 or virtual item 144 for the selected storage space, and indicate a user ranking of the output virtual usage 142, 144.

The transceiver 108 may include Bluetooth, Wi-Fi, cellular, and/or other communication technologies. (Bluetooth is a registered trademark of Bluetooth SIG, Inc., WIFI is a trademark of the Wi-Fi Alliance)

The memory 106 may comprise non-volatile and/or volatile memory types, such as a Flash Memory (NAND dies of flash memory cells), a non-volatile dual in-line memory module (NVDIMM), DIMM, Static Random Access Memory (SRAM), ferroelectric random-access memory (FeTRAM), Random Access Memory (RAM) drive, Dynamic RAM (DRAM), storage-class memory (SCM), Phase Change Memory (PCM), resistive random access memory (RRAM), spin transfer torque memory (STM-RAM), conductive bridging RAM (CBRAM), nanowire-based non-volatile memory, magnetoresistive random-access memory (MRAM), and other electrically erasable programmable read only memory (EEPROM) type devices, hard disk drives, removable memory/storage devices, etc.

The bus 120 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Generally, program modules, such as the program components 122, 124, 128, 132, 146, 148 may comprise routines, programs, objects, components, logic, data structures, and so on that perform particular tasks or implement particular abstract data types. The program modules may be practiced in distributed cloud computing environments where tasks are performed by remote processing devices that are linked through a communications network. In a distributed cloud computing environment, program modules may be located in both local and remote computer system storage media including memory storage devices.

The program components and hardware devices of the storage space manager 100 of FIG. 1 may be implemented in one or more computer systems. If they are implemented in multiple computer systems, then the computer systems may communicate over a network.

The program components 122, 124, 128, 132, 146, 148 may be accessed by the processor 104 from a memory 106 to execute. Alternatively, some or all of the program components 122, 124, 128, 132, 146, 148 may be implemented in separate hardware devices, such as Application Specific Integrated Circuit (ASIC) hardware devices.

The functions described as performed by the program components 122, 124, 128, 132, 146, 148 may be implemented as program code in fewer program modules than shown or implemented as program code throughout a greater number of program modules than shown.

A storage infrastructure is comprised of physical storage spaces, such as shelves, containers, cabinets, lockers, safes, secure rooms, rooms, crawl spaces, refrigerators, etc., that may be located in one or more rooms or floors of a building, or comprise an entire warehouse having numerous shelves and other storage areas.

In certain embodiments, the storage space information 200, item information 300, and historical virtual usage output 400 may be implemented as part of a virtual representation of the storage infrastructure, such as the case with a digital twin. In such implementations, the usage predictive model 132 may be part of the digital twin of the physical storage infrastructure to accurately reflect the physical storage spaces and items stored in the storage spaces to simulate how items may be stored in the storage infrastructure. The described embodiments may integrate with a digital twin of the object to simulate various scenarios for determining virtual usage of a storage space, such as the International Business Machines® Digital Twin technology. The usage predictive model 132 for the digital twin may perform the determination of the virtual usage simulation based on various parameters, such as, but not limited to, the storage space information 200, item information 300, and historical storage space allocations 400. (International Business Machines is a trademark of International Business Machines Corporation throughout the world).

Figure 2:
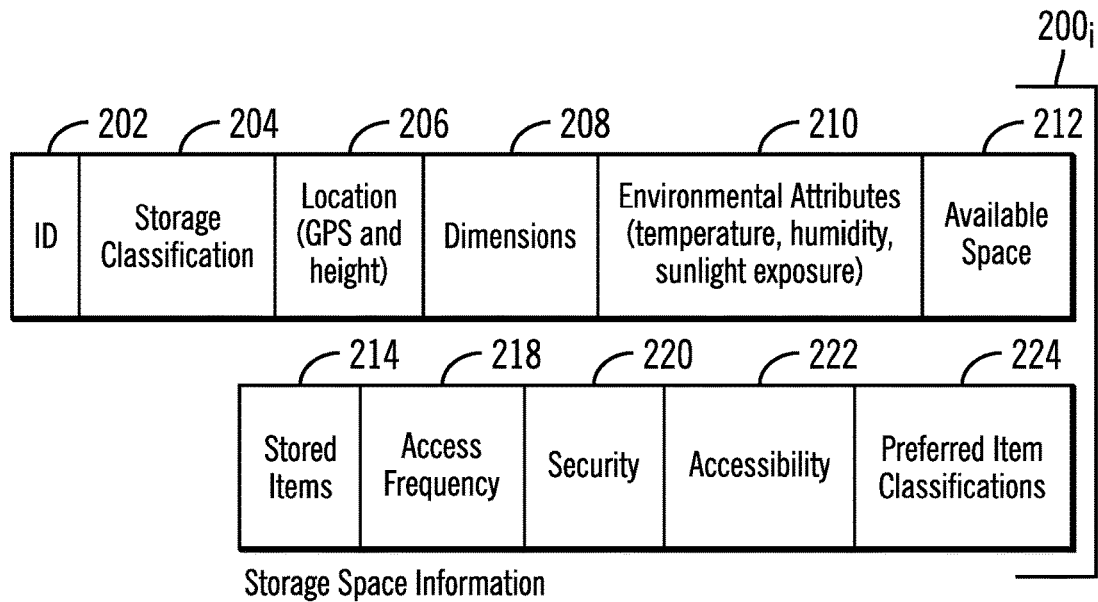
FIG. 2 illustrates an embodiment of storage space information for a storage space in a storage infrastructure.

FIG. 2 illustrates an embodiment of an instance of storage space information 200i for a storage space in a storage infrastructure, such as a shelf, box, locker, cabinet, etc., and includes a unique identifier (ID) 202; a storage classification 204 of the storage providing one or more contexts or types of the storage space 202, such as cabinet, shelf, box, room, residential storage, warehouse, retail store, business stock room, type or context of storage space (bathroom, bedroom, kitchen, garage, etc.) type of business where storage located (e.g., retail clothing, groceries, box retail store, electronics, etc.); a location 206, such as a GPS location and a height of the storage space, such as a shelf height; dimensions 208 of the storage space in which items may be placed, including physical boundaries; environmental attributes 210 of the storage space, such as temperature, humidity, sunlight exposure, etc., which may be updated from information from the storage space IoT monitors 150; available space 212 in the storage space 202; items 214 currently or previously stored in the storage space 202; an access frequency 218 indicating a frequency or number of accesses of items stored in the storage space 202, including current and past items; a security level 220 of the storage space, such as locked, alarm coverage, safe, etc.; accessibility 222 or ease of access and visibility of the storage space, considering height, lighting, crawl space, etc.; preferred item classifications 224 of items preferred to store in the storage space 202, which may be provided by the users of the storage infrastructure or based on uses from other users.

With the described embodiments, the storage spaces can be associated with a unique identifier tagged with a dynamic virtual tag or label that can be remotely sensed by the system. In certain embodiments, when an item is removed and then returned to a storage space, the item information may reinforce an established relationship between the storage space and the item over a period of time to understand a particular storage space is intended for a particular object. An established relationship between an item and a storage space may be reflected in the preferred item classifications 224 for the storage space.

Figure 3:
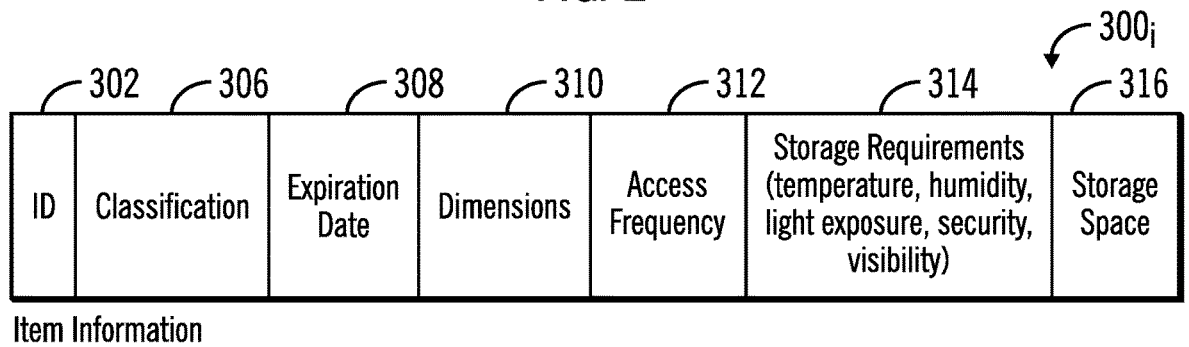
FIG. 3 illustrates an embodiment of item information for items placed in the storage spaces.

FIG. 3 illustrates an embodiment of an instance of item information $300_i$ for an item stored in the storage infrastructure, and includes: a unique ID 302 of an item; a classification 306, such as determined by the item classifier 128, such as a type of object, model number, specific type, etc.; an expiration date 308 if the item is perishable; physical dimensions 310 of the item, including size and weight; an access frequency 312 indicating a frequency at which the item is accessed when placed in a storage space or a predetermined access frequency 312 based on experiences in other storage infrastructures; storage requirements 314, such as temperature, humidity, light exposure, security, visibility, etc.; and a storage space 316 in which the item 302 is placed.

The item information $300_i$ and item attributes 138 may further include sales predictions of items to store in the storage spaces, which is provided as input to the usage predictive model 132, to bias the usage predictive model 132 to output virtual items 144 having high predicted sales and to output virtual segmentations 142 is to accommodate dimensions of items having high predicted sales.

When an item is first received to add to the storage infrastructure, the item classifier 128 may classify the item and generate item information $300_i$ having information predetermined for the classified item, such as the expiration date 308, dimensions 310, a historical access frequency 312 determined from when the item is stored in other storage infrastructures; and the storage requirements 314. When the item is added to the storage space, the access frequency 312 may be cleared to measure the frequency while stored in a storage space.

Figure 4:
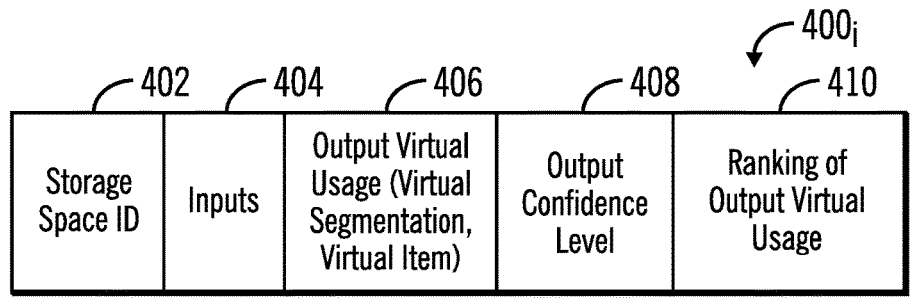
FIG. 4 illustrates an embodiment of a historical virtual usage output for a storage space outputted by a predictive model based on attributes of the storage space, items placed in the storage space, and users of the storage space.

FIG. 4 illustrates an embodiment of an instance of a historical virtual usage output $400_i$ determined after the usage predictive model 132 determines an output virtual usage 142, 144 for the selected storage space 134 by processing inputs 134, 136, 138, and 140, and includes: a storage space ID; inputs 404 to the usage predictive model 132, such as 134, 136, 138, and 140; the output virtual usage 406, e.g., virtual segmentation 142, virtual item 144, or other type of usage that can be visualized; an output confidence level 408 produced by the usage predictive model 132 of the confidence level the output virtual usage 406 is optimal for the selected storage space 402; and a ranking 410 of the output virtual usage 406, such as a high or low ranking based on user feedback or feedback of whether the output virtual usage 406 is subsequently realized or implemented for the storage space 402.

The information arranged in data structures $200_i$, $300_i$, and $400_i$ may be arranged in a different number of data structures and the data structures may include additional information relevant to items and storage spaces.

The historical virtual usage output $400_i$ may be used to determine positive and negative training sets to use to train the usage predictive model 132 to adjust the outputted confidence level 408 based on a user ranking or feedback of whether output virtual usage 406 implemented for the storage space 402.

The historical virtual usage output 400 may be gathered from storage space managers 100 deployed at different storage infrastructures to train the usage predictive model 132 from a wider data space of usage of the usage predictive model 132 to improve the training of the model 132 using a larger data set.

Figure 5:
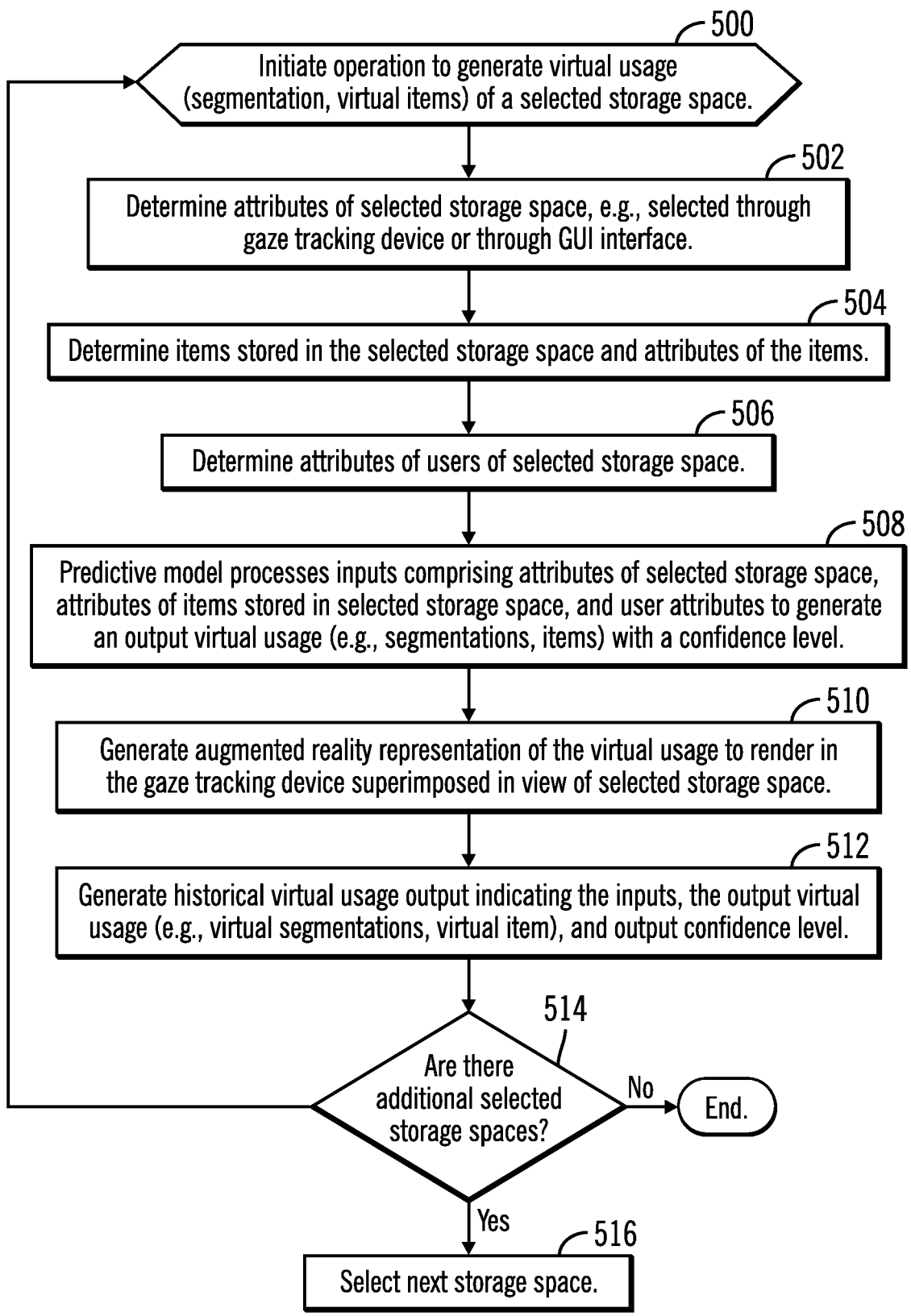
FIG. 5 illustrates an embodiment of operations to generate a virtual usage for a selected storage space.

FIG. 5 illustrates an embodiment of operations performed by the storage space manager program 124, item classifier 128, usage predictive model 132, and augmented reality generator 146 to determine a virtual usage for a selected storage space 134, and generate an augmented reality presentation of the virtual usage for the selected storage space 134, such as a virtual segmentation 142 of the storage space or virtual items 144 that can be located in the storage space. The selected storage space 134 for which the virtual usage is determined may be selected by a user through the gaze tracking device 110 tracking eye movement to determine the portion of the field of view or storage space the user is viewing. Further the selected storage space 134 may be determined through user input received via the microphone 112 or input controls 116. Upon initiating (at block 500) an operation to determine a virtual usage for the selected storage space 134, the storage space manager 124 may determine (at block 502) attributes of the selected storage space 136, such as from the storage space information $200_i$ for the selected storage space, e.g., selected through gaze tracking device or through GUI interface. The items that have been stored in the selected storage space 134 may be determined (at block 504) from field 214 of the storage space information $200_i$ and the item attributes 138 may be determined from the item information $300_i$ for the determined items. The user attributes 140 of users accessing the selected storage space 134 is determined (at block 506), such as reachability of the users, strength rating or ability to lift heavy objects, authorization or security level, user group, etc. The storage space manager 124, after determining the inputs, calls (at block 508) the usage predictive model 132 to process the inputs, such as attributes 136 of the selected storage space, attributes 138 of items stored in the selected storage space 134, and user attributes 140, to generate an output virtual usage 142, 144 (e.g., segmentations, items) with a confidence level, indicating a likelihood the output is correct or will be acceptable to the user. In certain embodiments, the usage predictive model 132 may generate multiple virtual usages with different confidence levels for the user to visualize a virtual segmentation of the selected storage space and virtual items in the selected storage space.

The augmented reality generator 146 may generate (at block 510) an augmented reality representation of the virtual usage to render in the gaze tracking device 110 as superimposed in view of the selected storage space 134. The storage space manager 124 may further generate (at block 512) historical virtual usage output $400_i$ indicating the inputs 404 (e.g., 134, 136, 138, 140), the output virtual usage 406, and the output confidence level 408. If (at block 514) there are additional selected storage spaces, such as in the field of view of the gaze tracking device 110, then a next storage space is selected (at block 516) and control proceeds back to block 500 to generate virtual usages for the additional selected storage space. If (at block 514) there are no further selected storage spaces, then control ends.

With the embodiment of operations of FIG. 5, the usage predictive model 132 receives, as input, information on the selected storage space, information on items stored in the selected storage space, and users of the selected storage space to determine an optimal usage of the selected storage space, such as in the form of a virtual segmentation or virtual item rendered within the selected storage space to visualize the optimal usage. Further, described embodiments may set a ranking 410 of the output virtual usage based on whether the virtual usage is realized for the selected storage space or user feedback on the output virtual usage. This historical virtual usage output 400 may be used to retrain the usage predictive model 132.

Figure 6:
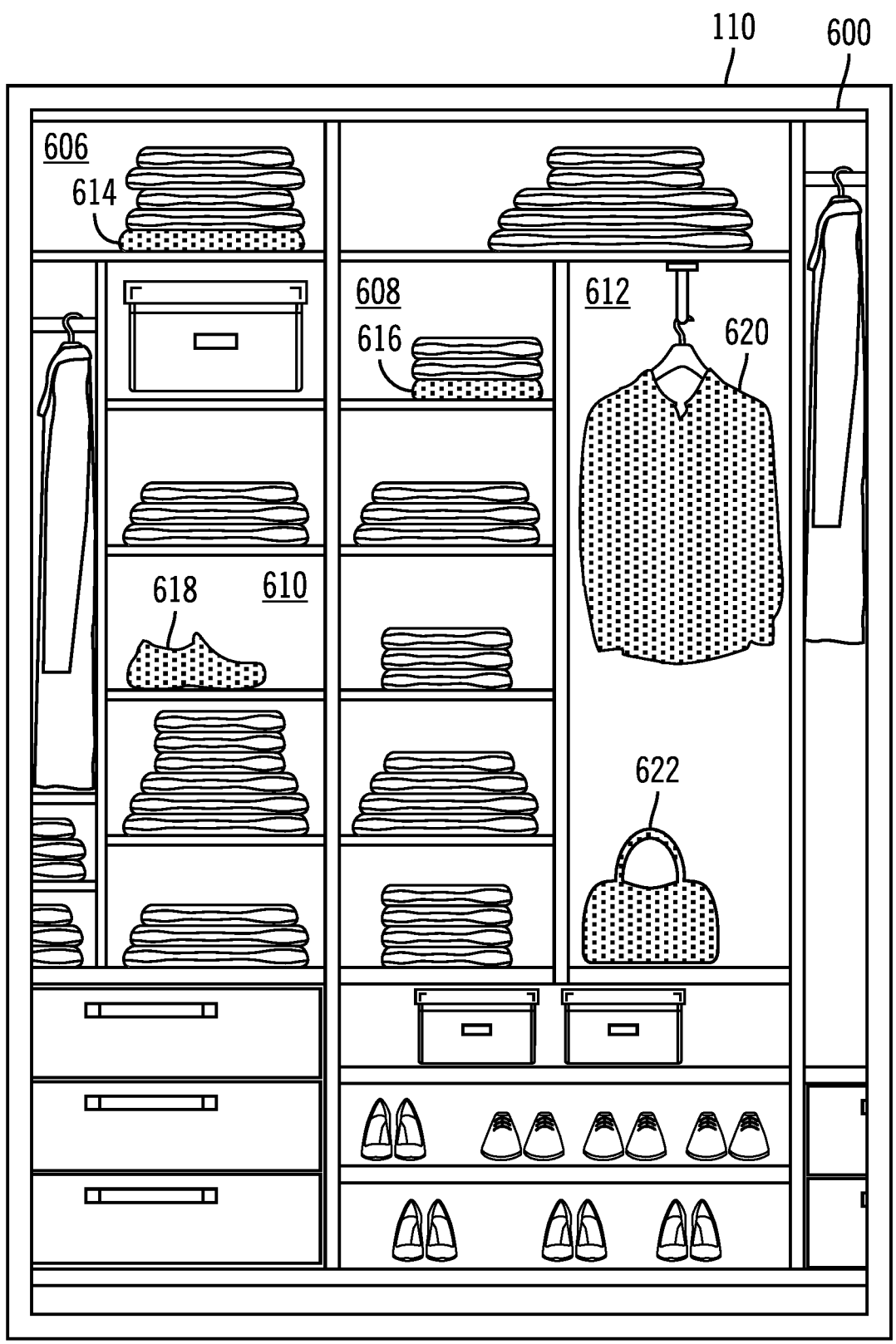
FIG. 6 illustrates an example where the generated virtual usage comprises virtual items generated as augmented reality representations in a storage space.

FIG. 6 illustrates an example of a plurality of closet storage spaces in a view 600 of a gaze tracking device 110. Selected storage spaces 606, 608, 610, and 612 are shown as having actual items located in the spaces and augmented reality representations of virtual items 614, 616, 618, 620 and 622, determined by the usage predictive model 132, in the view 604 of the gaze tracking device 602. In storage space 612, multiple virtual items 620 and 622 are represented. In this way, view 600 provides a visualization of how the storage spaces are used to store virtual items not currently stored in the storage spaces.

Figure 7:
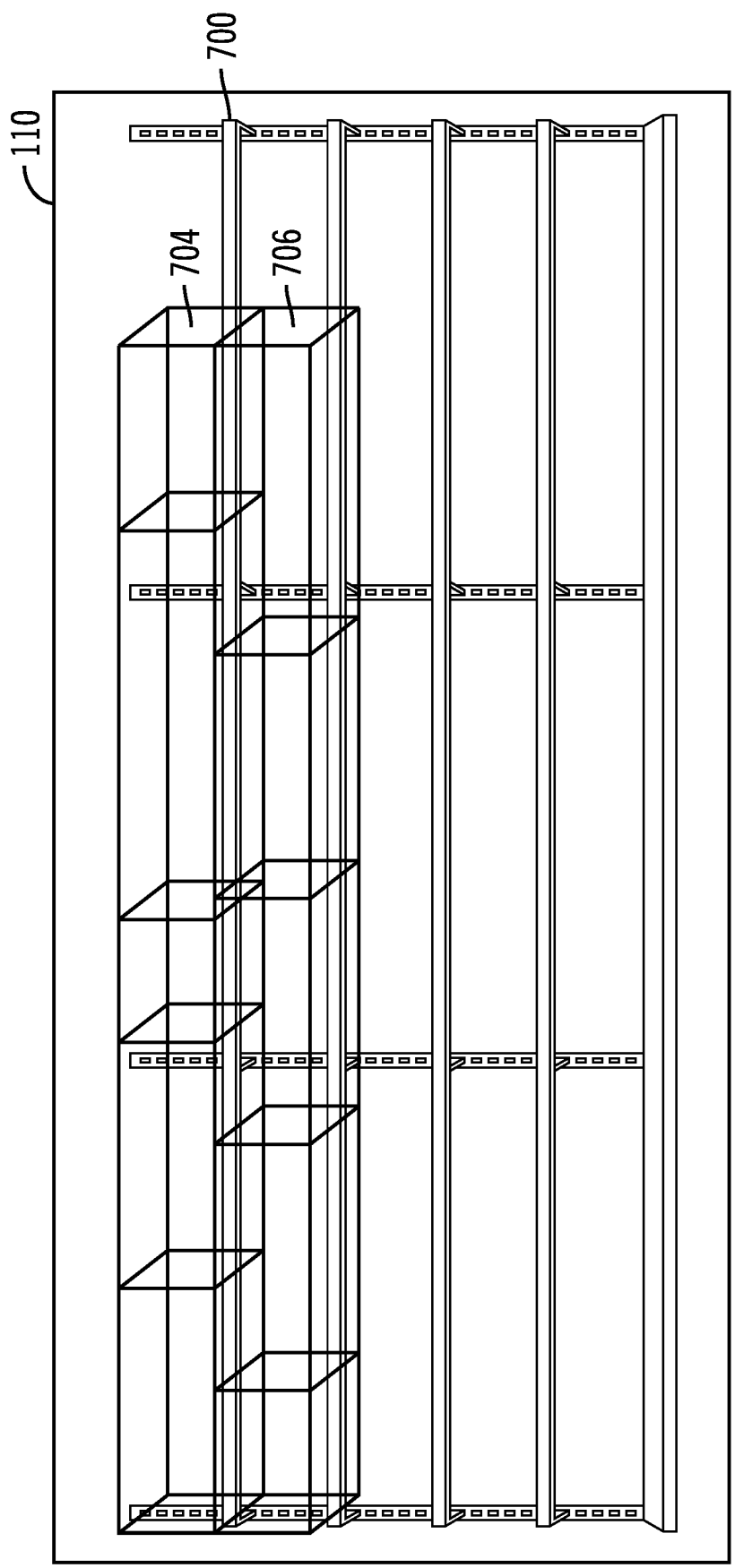
FIG. 7 illustrates an example where the generated virtual usage comprises virtual segmentations generated as augmented reality representations in a storage space.

FIG. 7 illustrates an example of a plurality of shelving storage spaces in a view 700 of a gaze tracking device 110. In one embodiment, each horizontal shelf may comprise a separate storage space or one or more of the shelves may comprise a storage space. Virtual segmentations 704 and 706 or shelf divisions are shown superimposed over the physical shelves to allow the user of the gaze tracking device 702 to visualize how the shelf storage spaces may be segmented and subdivided to optimize storage usage.

Figure 8:
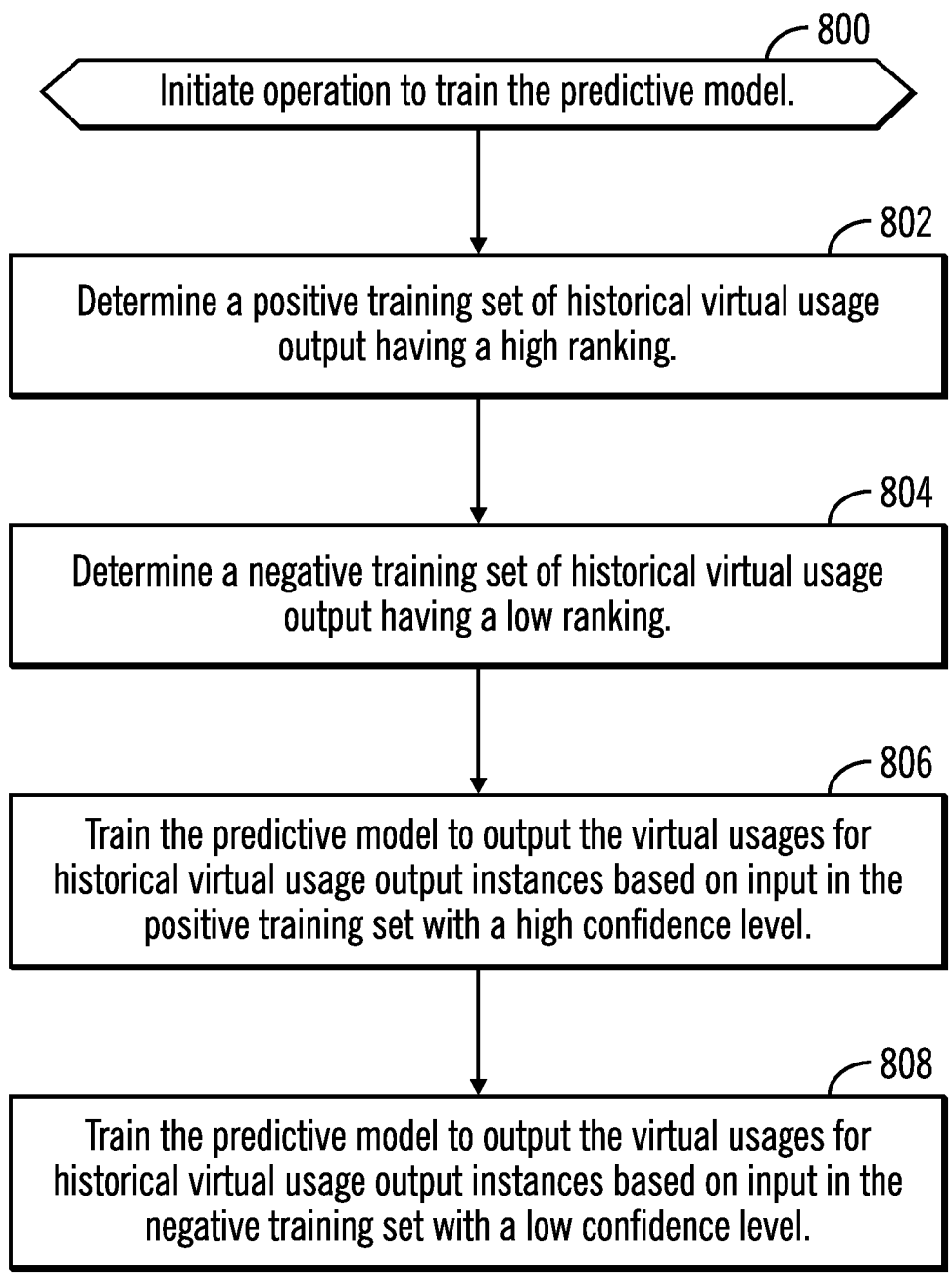
FIG. 8 illustrates an embodiment of operations to train the predictive model.

FIG. 8 illustrates an embodiment of operations performed by the storage space manager program 124 and usage predictive model 132 to train the usage predictive model 132 based on historical virtual usage output 400 gathered when running the usage predictive model 132 in FIG. 5 or provided by predictive models 132 operating in other storage infrastructures. Upon initiating (at block 800) an operation to train the usage predictive model 132, the storage space manager 124 may determine (at block 802) a positive training set of historical virtual usage output instances $400_P$ having a high ranking 410 and determine (at block 804) a negative training set of historical virtual usage output instances $400_N$ having a low ranking 410. The usage predictive model 132 is trained (at block 806) to output the virtual usages 406 based on input 404 in the historical virtual usage output instances $400_P$ in the positive training set with a high confidence level. The usage predictive model 132 is trained (at block 808) to output the virtual usages 406 based on input 404 in the historical virtual usage output instances $400_N$ in the negative training set with a low confidence level.

For artificial neural network program implementations of the usage predictive model 132, the usage predictive model 132 may be trained using backward propagation to adjust weights and biases at nodes in a hidden layer to produce the output virtual usages. In backward propagation used to train a neural network machine learning module, biases at nodes in the hidden layer are adjusted accordingly to produce the output virtual usages 406 having specified confidence levels based on the input 404 used to previously produce the output 406. Backward propagation may comprise an algorithm for supervised learning of artificial neural networks using gradient descent. Given an artificial neural network and an error function, the method may calculate the gradient of the error function with respect to the neural network's weights and biases.

Figure 9:
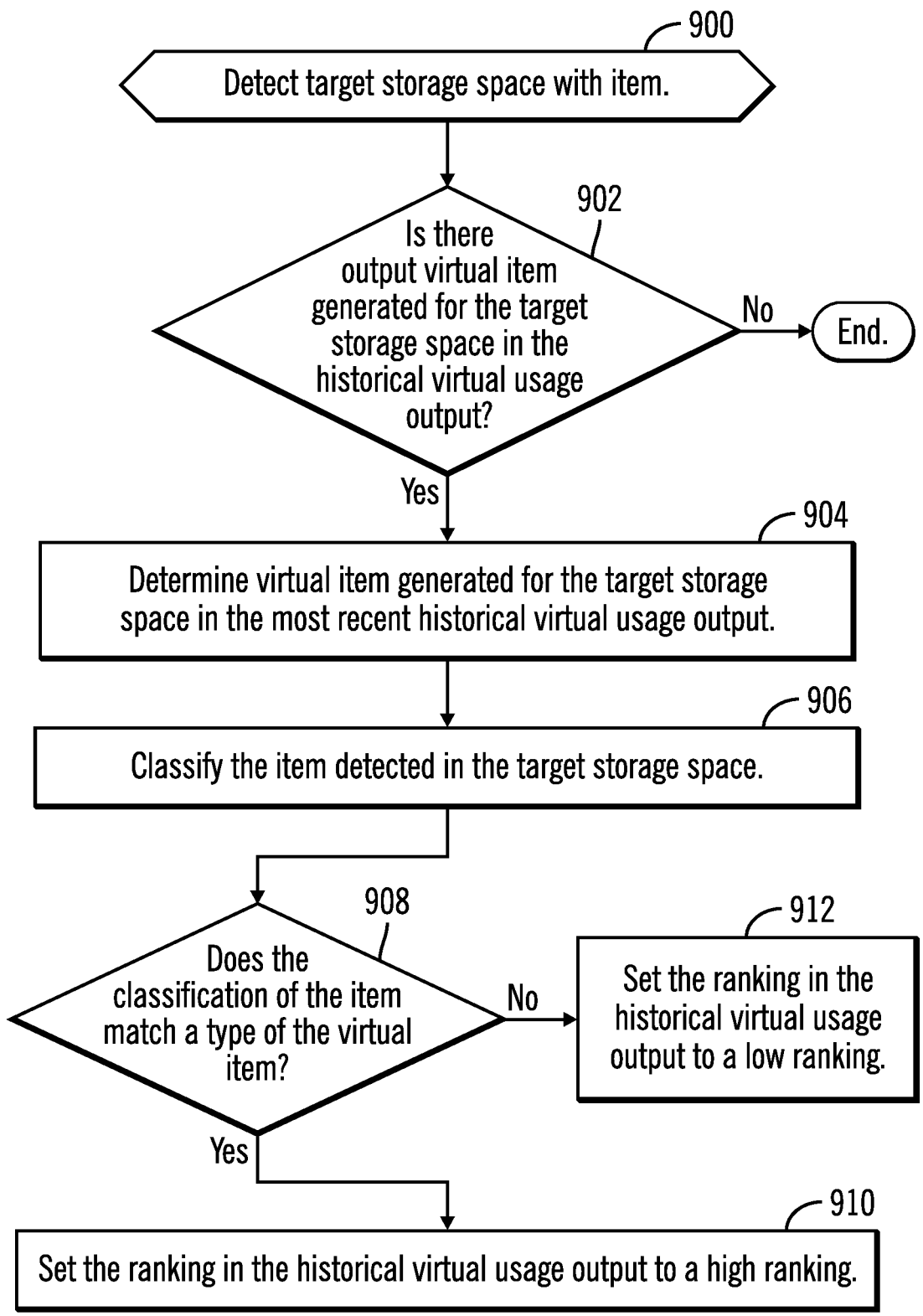
FIG. 9 illustrates an embodiment of operations to adjust a ranking for a virtual item generated for a storage space based on actual items subsequently located in the storage space.

FIG. 9 illustrates an embodiment of operations performed by the gaze tracking device interface 148, item classifier 128, and storage space manager program 124 to determine whether to adjust the ranking 410 of an output virtual item in historical virtual usage output 400i based on whether the virtual item was subsequently realized or placed in the storage space 402. Upon the gaze tracking device interface 148 detecting (at block 900) a target storage space having an item, such as by tracking the user gaze on the target storage space, the storage space manager 124 determines (at block 902) whether there is an output virtual item generated for the target storage space in historical virtual usage output $400_i$ for the target storage space. If not, control ends. However, if (at block 902) a virtual item 406 was generated for the target storage space and indicated in historical virtual usage output $400_i$ for the target storage space, then the storage space manager 124 determines (at block 904) virtual item 406 generated for the target storage space in the most recent historical virtual usage output $400_i$. The item classifier 128 may classify (at block 906) the physical item detected in the target storage space. If (at block 908) the classification of the physical item matches a type of the virtual item 406, then the ranking 410 in the historical virtual usage output $400_i$ is set (at block 910) to a high ranking. Otherwise, if (at block 908) there is no match, then the ranking 410 is set (at block 912) to a low ranking.

Figure 10:
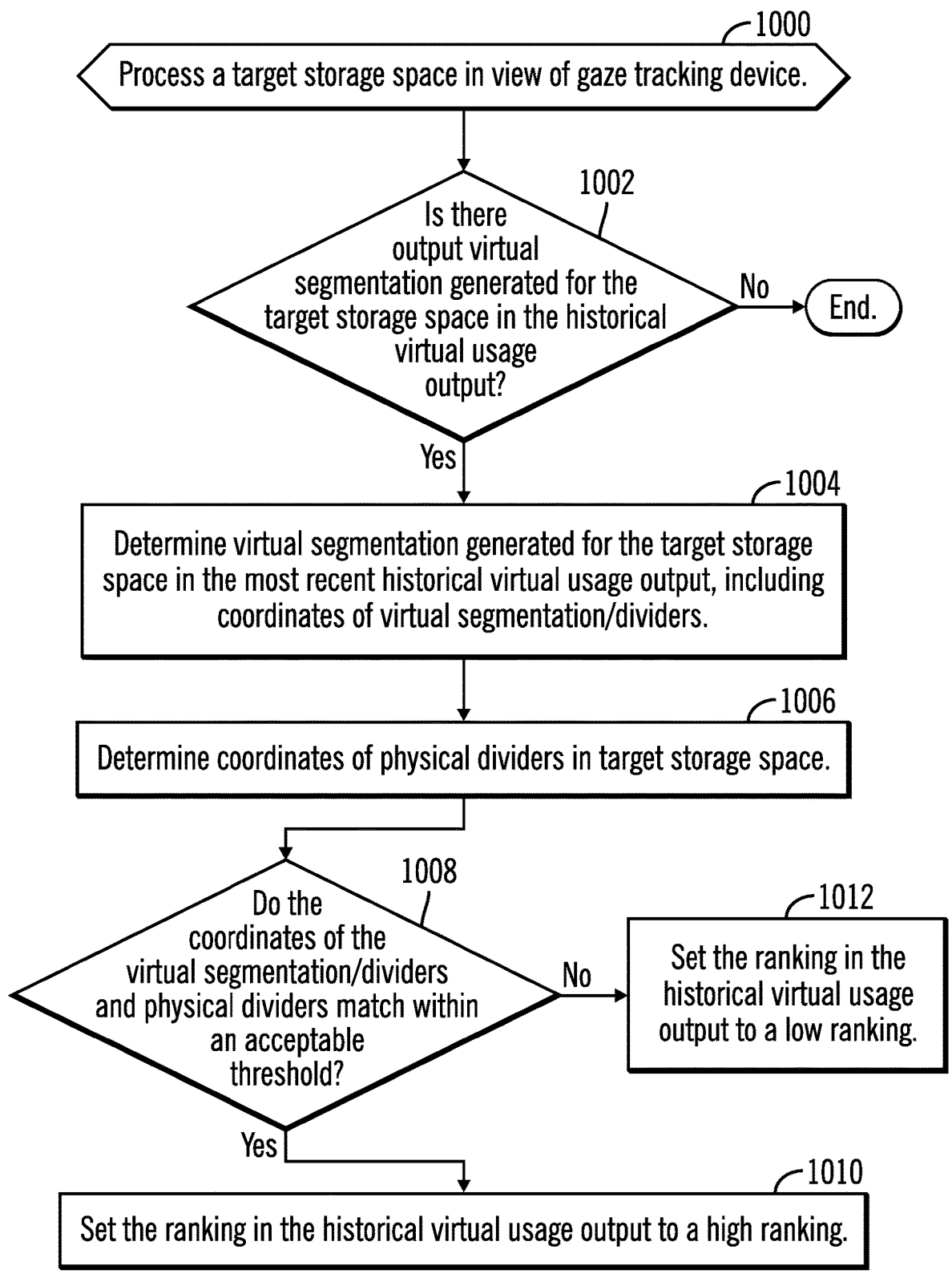
FIG. 10 illustrates an embodiment of operations to adjust a ranking for a virtual segmentation generated for a storage space based on an actual subsequent segmentation in the storage space.

FIG. 10 illustrates an embodiment of operations performed by the gaze tracking device interface 148 and storage space manager program 124 to determine whether to adjust the ranking 410 of the output virtual segmentation 406 in historical virtual usage output 400i based on whether the output virtual segmentation 406 was subsequently realized or physically implemented in the storage space 402. Upon the gaze tracking device interface 148 detecting (at block 1000) a target storage space, such as by tracking the user gaze on the target storage space, the storage space manager 124 determines (at block 1002) whether there is an output virtual segmentation 406 generated for the target storage space in historical virtual usage output $400_i$ for the target storage space. If not, control ends. However, if (at block 1002) a virtual segmentation 406 was generated for the target storage space and indicated in historical virtual usage output $400_i$ for the target storage space, then the storage space manager 124 determines (at block 1004) a virtual segmentation 406 generated for the target storage space in the most recent historical virtual usage output $400_i$, including coordinates of the virtual segmentation/dividers that define the virtual segmentation. The gaze tracking device interface 148 may determine (at block 1006) the coordinates of physical dividers in the target storage space in the view of the gaze tracking device 110. If (at block 1008) the coordinates of the virtual segmentation/dividers 406 match the physical dividers within an acceptable threshold or distance margin of error, then the ranking 410 in the historical virtual usage output $400_i$ is set (at block 1010) to a high ranking. Otherwise, if (at block 1008) there is no match within a distance margin of error or threshold, then the ranking 410 is set (at block 1012) to a low ranking With the embodiments of FIGS. 9 and 10, after determining a virtual usage, such as a virtual segmentation 142 or virtual items 144, if the storage space, for which the virtual usage was determined, again appears in a view of the gaze tracking device 110, then a determination may be made if the determined virtual usage was subsequently realized in the storage space, such as whether a physical item matching the virtual item was placed in the storage space or whether the coordinates of storage space physical divisions are sufficiently similar to the coordinates of the virtual segmentation/division. The rankings 410 for the previously determined virtual usage may be adjusted based on the extent to which the virtual usage was realized in the storage space. In one embodiment, if there are no items in the viewed storage space or no subdivision or segmentation, then no change may be made to the ranking 410. The realization adjusted ranking 410 may then be used to train the usage predictive model 132 to output a virtual usage with a higher confidence level or lower confidence level based on the ranking reflecting the extent to which the virtual usage was actually later realized for the storage space.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
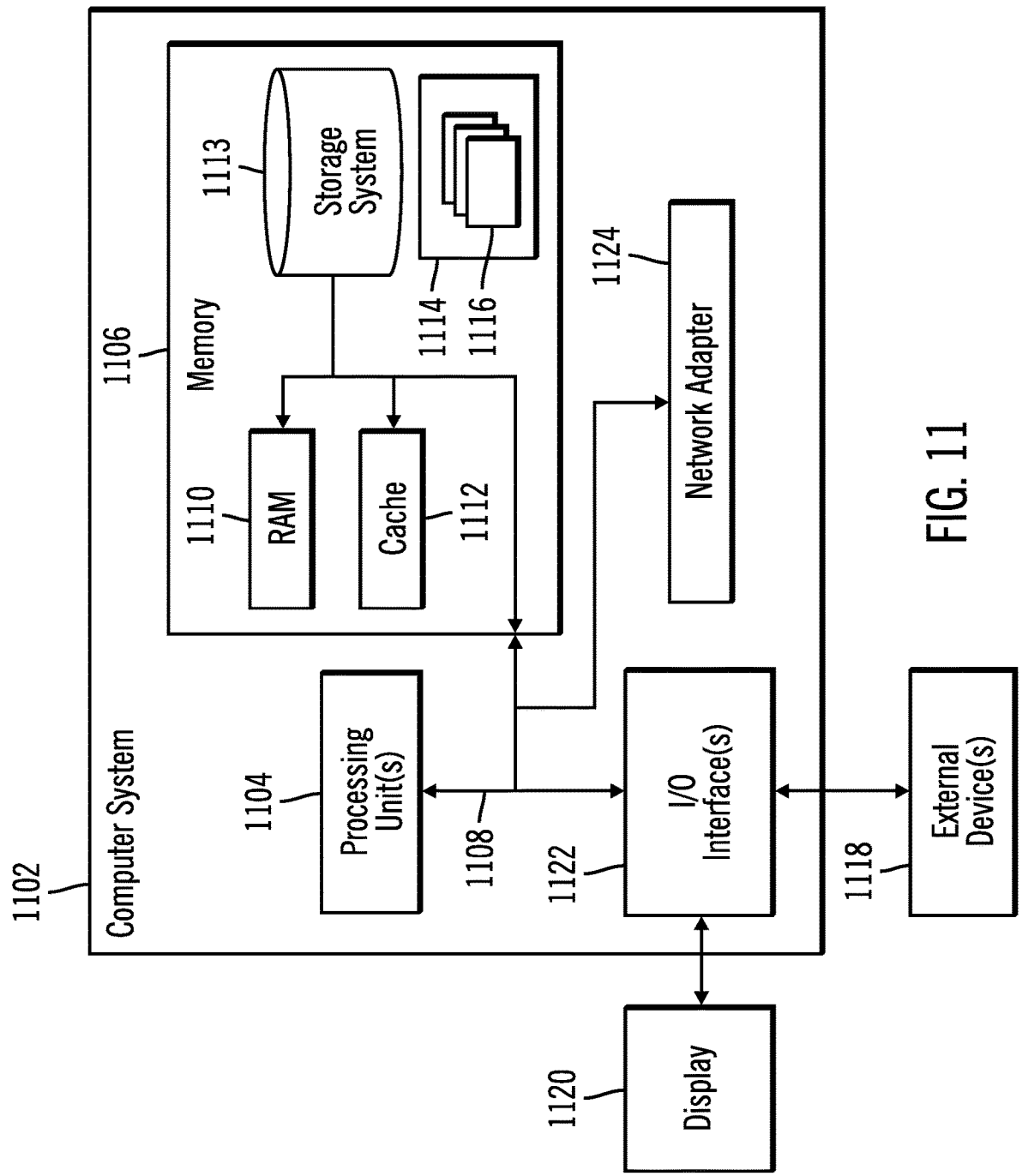
FIG. 11 illustrates a computing environment in which the components of FIG. 1 may be implemented.

The computational components of FIG. 1, including the storage space manager 100, gaze tracking device 110, and storage space IoT monitors 150 may be implemented with one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The letter designators, such as i and n, used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for rendering in a computer display a virtual usage of storage spaces in a storage infrastructure, the computer program product comprising a non-transitory computer readable storage medium having computer readable program code embodied therein that executes to perform operations, the operations comprising:
providing information on physical boundaries and usages of the storage spaces in the storage infrastructure, and a predictive model used to determine storage spaces for items to store in the storage spaces, wherein the predictive model implements machine learning;
receiving, by the predictive model, inputs comprising physical boundaries of a selected storage space, attributes of users of the selected storage space, and attributes of items stored in the selected storage space;
processing, by the machine learning of the predictive model, the inputs to output a virtual usage of the selected storage space within the physical boundaries of the selected storage space, wherein the virtual usage is defined by coordinates in the physical boundaries of the selected storage space and a virtual item to store in the selected storage space;

generating, in the computer display, an augmented reality representation overlaying the virtual usage at the coordinates within a view of the selected storage space; and training the machine learning of the predictive model to output virtual usages in a positive training set for inputs in the positive training set comprising physical boundaries of storage spaces, attributes of users of the storage spaces, and attributes of items stored in the storage spaces.

2. The computer program product of claim 1, wherein the computer display comprises a gaze track device, wherein the selected storage space is visible in a field of view of the gaze tracking device, wherein the augmented reality representation overlaying the virtual usage of the selected storage space comprises rendering the virtual usage in the gaze tracking device superimposed over the selected storage space visible in the field of view of the gaze tracking device.

3. The computer program product of claim 1, wherein the usages of the selected storage space provided as input to the predictive model comprises at least a plurality of a type of use of the selected storage space, environmental properties of the selected storage space, current usages of the selected storage space, reachability of users accessing the selected storage space, attributes of items having been placed in the selected storage space, and dimensions of the items having been placed in the selected storage space.

4. The computer program product of claim 1, wherein the operations further comprise:
determining selected storage spaces in a field of view; and
for the determined selected storage spaces, providing the inputs for the selected storage spaces to the predictive model to output virtual usages of the selected storage spaces.

5. The computer program product of claim 1, wherein the virtual usage of the selected storage space comprises virtual segmentations providing virtual divisions of the selected storage space into multiple virtual storage spaces, and wherein the augmented reality representation of the virtual segmentations comprises rendering the virtual segmentations overlaid over the view of the selected storage space in a field of view to render the virtual divisions of the selected storage space.

6. The computer program product of claim 1, wherein the virtual usage of the selected storage space comprises virtual items to store in the selected storage space, and wherein the augmented reality representation of the virtual items to store comprises rendering the virtual items to store overlaid in the view of the selected storage space.

7. The computer program product of claim 1, wherein the operations further comprise:
maintaining historical virtual usage outputs including inputs to the predictive model, output virtual usages of the storage spaces based on the inputs, and rankings of appropriateness of the output virtual usages for the storage spaces, wherein the positive training set comprises historical virtual usage outputs having rankings exceeding an appropriateness threshold;
generating a negative training set of historical virtual usage outputs having rankings falling below the appropriateness threshold;
wherein the training the predictive model to output the virtual usages for the storage spaces in the historical virtual usage outputs in the positive training set is performed to output the virtual usages with a high confidence level; and
training the predictive model to output the virtual usages for the storage spaces in the historical virtual usage outputs in the negative training set with a low confidence level.

8. The computer program product of claim 7, wherein the virtual usages of the storage spaces comprise virtual items to be stored in the storage spaces, and wherein augmented reality representations of the virtual items comprise rendering images representing the virtual items overlaid over the storage spaces to show how the virtual items can be stored in the storage spaces to optimize usage, wherein the operations further comprise:
determining an item a user placed in a target storage space for which a virtual item was generated for the target storage space;
determining a classification of the determined item placed in the target storage space; and
determining whether the classification of the determined item matches a classification of the virtual item outputted for the target storage space in a historical virtual usage output, wherein a ranking of the virtual item in the historical virtual usage output for the target storage space is set to a high ranking in response to the determining that the classification of the determined item matches the classification of the virtual item, and wherein the ranking of the virtual item in the historical virtual usage output for the target storage space is set to a low ranking in response to the determining that the classification of the determined item does not match the classification of the virtual item.

9. The computer program product of claim 7, wherein the virtual usages of the storage spaces comprise virtual segmentations of the storage spaces, and wherein augmented reality representations of the virtual segmentations comprise rendering the virtual segmentations overlaid over the storage spaces in the view to show how the storage spaces can be divided to optimize usage, wherein the operations further comprise:
processing a view of a target storage space for which virtual segmentations were generated for the target storage space;
determining physical segmentations of the target storage space added after generating the virtual segmentations; and
determining a degree to which the physical segmentations of the target storage space match the virtual segmentations of the target storage space in a historical virtual usage output, wherein a ranking of the virtual segmentations in the historical virtual usage output for the target storage space is set to a high ranking in response to the determining that the degree of the match exceeds a degree threshold, and wherein the ranking of the virtual segmentations in the historical virtual usage output for the target storage space is set to a low ranking in response to the determining that the degree of the match is below the degree threshold.

10. A system for rendering in a computer display a virtual usage of storage spaces in a storage infrastructure, comprising:
a processor; and
a computer readable storage medium having computer readable program code embodied therein that executes to perform operations, the operations comprising:
providing information on physical boundaries and usages of the storage spaces in the storage infrastructure, and a predictive model used to determine storage spaces for items to store in the storage spaces, wherein the predictive model implements machine learning;

receiving, by the predictive model, inputs comprising physical boundaries of a selected storage space, attributes of users of the selected storage space, and attributes of items stored in the selected storage space;

processing, by the machine learning of the predictive model, the inputs to output a virtual usage of the selected storage space within the physical boundaries of the selected storage space, wherein the virtual usage is defined by coordinates in the physical boundaries of the selected storage space and a virtual item to store in the selected storage space;

generating, in the computer display, an augmented reality representation overlaying the virtual usage at the coordinates within a view of the selected storage space; and training the machine learning of the predictive model to output virtual usages in a positive training set for inputs in the positive training set comprising physical boundaries of storage spaces, attributes of users of the storage spaces, and attributes of items stored in the storage spaces.

11. The system of claim 10, wherein the computer display comprises a gaze track device, wherein the selected storage space is visible in a field of view of the gaze tracking device, wherein the augmented reality representation overlaying the virtual usage of the selected storage space comprises rendering the virtual usage in the gaze tracking device superimposed over the selected storage space visible in the field of view of the gaze tracking device.

12. The system of claim 10, wherein the virtual usage of the selected storage space comprises virtual segmentations providing virtual divisions of the selected storage space into multiple virtual storage spaces, and wherein the augmented reality representation of the virtual segmentations comprises rendering the virtual segmentations overlaid over the view of the selected storage space in a field of view to render the virtual divisions of the selected storage space.

13. The system of claim 10, wherein the virtual usage of the selected storage space comprises virtual items to store in the selected storage space, and wherein the augmented reality representation of the virtual items to store comprises rendering the virtual items to store overlaid in the view of the selected storage space.

14. The system of claim 10, wherein the operations further comprise:

maintaining historical virtual usage outputs including inputs to the predictive model, output virtual usages of the storage spaces based on the inputs, and rankings of appropriateness of the output virtual usages for the storage spaces, wherein the positive training set comprises historical virtual usage outputs having rankings exceeding an appropriateness threshold;

generating a negative training set of historical virtual usage outputs having rankings falling below the appropriateness threshold;

wherein the training the predictive model to output the virtual usages for the storage spaces in the historical virtual usage outputs in the positive training set is performed to output the virtual usages with a high confidence level; and training the predictive model to output the virtual usages for the storage spaces in the historical virtual usage outputs in the negative training set with a low confidence level.

15. The system of claim 14, wherein the virtual usages of the storage spaces comprise virtual items to be stored in the storage spaces, and wherein augmented reality representations of the virtual items comprise rendering images representing the virtual items overlaid over the storage spaces to show how the virtual items can be stored in the storage spaces to optimize usage, wherein the operations further comprise:

determining an item a user placed in a target storage space for which a virtual item was generated for the target storage space;

determining a classification of the determined item placed in the target storage space; and determining whether the classification of the determined item matches a classification of the virtual item outputted for the target storage space in a historical virtual usage output, wherein a ranking of the virtual item in the historical virtual usage output for the target storage space is set to a high ranking in response to the determining that the classification of the determined item matches the classification of the virtual item, and wherein the ranking of the virtual item in the historical virtual usage output for the target storage space is set to a low ranking in response to the determining that the classification of the determined item does not match the classification of the virtual item.

16. A method for rendering in a computer display a virtual usage of storage spaces in a storage infrastructure, comprising:

providing information on physical boundaries and usages of the storage spaces in the storage infrastructure, and a predictive model, implementing machine learning, used to determine storage spaces for items to store in the storage spaces;

receiving, by the predictive model, as inputs, physical boundaries and usages of a selected storage space;

processing, by the predictive model, the inputs to output a virtual usage of the selected storage space within the physical boundaries of the selected storage space, wherein the virtual usage is defined by coordinates in the physical boundaries of the selected storage space;

generating, in the computer display, an augmented reality representation overlaying the virtual usage at the coordinates within a view of the selected storage space;

maintaining historical virtual usage outputs including inputs to the predictive model, output virtual usages of the storage spaces based on the inputs, and rankings of appropriateness of the output virtual usages for the storage spaces; and training the predictive model to output the output virtual usages for the storage spaces in the historical virtual usage outputs with confidence levels based on the rankings of appropriateness for the output virtual usages in the historical virtual usage outputs.

17. The method of claim 16, wherein the computer display comprises a gaze tracking device, wherein the selected storage space is visible in a field of view of the gaze tracking device, wherein the augmented reality representation overlaying the virtual usage of the selected storage space comprises rendering the virtual usage in the gaze tracking device superimposed over the selected storage space visible in the field of view of the gaze tracking device.

18. The method of claim 16, wherein the virtual usage of the selected storage space comprises virtual segmentations providing virtual divisions of the selected storage space into multiple virtual storage spaces, and wherein the augmented reality representation of the virtual segmentations comprises rendering the virtual segmentations overlaid over the view of the selected storage space in a field of view to render the virtual divisions of the selected storage space.

19. The method of claim 16, wherein the virtual usage of the selected storage space comprises virtual items to store in the selected storage space, and wherein the augmented reality representation of the virtual items to store comprises rendering the virtual items to store overlaid in the view of the selected storage space.

20. The method of claim 16, wherein the predictive model comprises a machine learning module, further comprising:
- generating a positive training set of historical virtual usage outputs having rankings exceeding an appropriateness threshold;
- generating a negative training set of historical virtual usage outputs having rankings falling below the appropriateness threshold; and
- wherein the training the predictive model comprises:
  - training the predictive model to output the virtual usages for the storage spaces in the historical virtual usage outputs in the positive training set with a high confidence level; and
  - training the predictive model to output the virtual usages for the storage spaces in the historical virtual usage outputs in the negative training set with a low confidence level.

\* \* \* \* \*